UNITED STATES PATENT OFFICE.

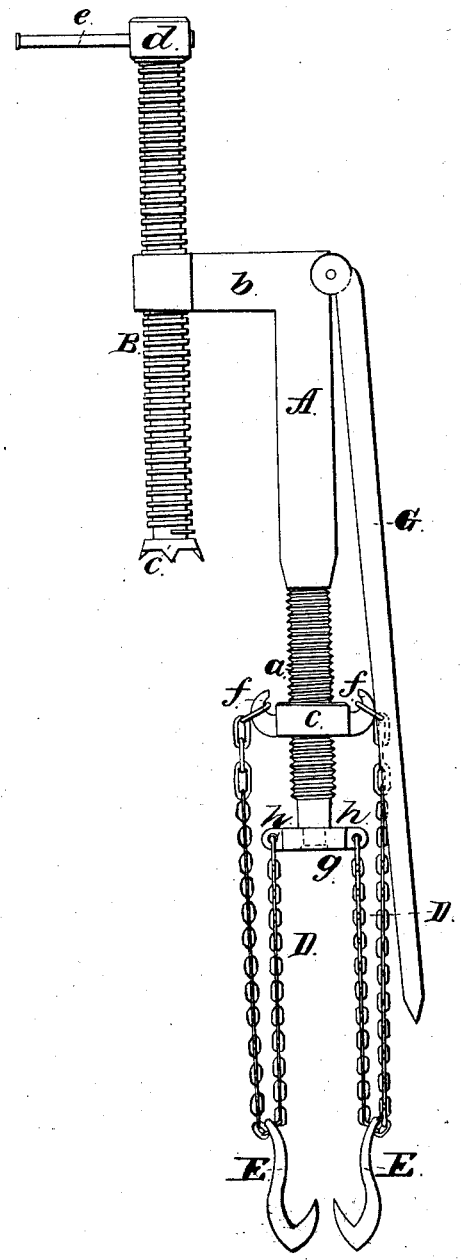

JOSEPH C. THOMAS, OF KENNEBUNK, MAINE.

IMPROVEMENT IN PLANKING-CLAMPS.

Specification forming part of Letters Patent No. 55,554, dated June 12, 1866.

*To all whom it may concern:*

Be it known that I, JOSEPH C. THOMAS, of Kennebunk, in the county of York and State of Maine, have invented a new and useful machine or apparatus for setting up a plank or forcing it closely up to a timber or rib of a vessel; and I do hereby declare the same to be fully described in the following specification, and represented in the accompanying drawing, which is a side elevation of it.

In such drawing, A denotes the head-stock of the machine, it being formed and provided with a long male screw, $a$, as exhibited. Another screw, B, screws through the head $b$ of the stock A and parallel with the screw $a$, and has a rotary spur, $c$, applied upon one end of it, there being a head, $d$, and a handle, $e$, at its other end.

A nut, C, furnished with two hooks, $ff$, is screwed on the screw $a$, and upon the foot of the stock A there is a rotary head or bearer, $g$, which has two perforated ears, $h\ h$, extending in opposite directions from it, and being for the purpose of enabling chains D D to be fixed to the said rotary head $g$. The said head $g$ is to be attached to the stock A, except in being capable of freely revolving therein. Each of the chains D D goes through the eye of one of two hooks, E E, and is hitched upon one of the hooks $ff$, the same being as shown in the drawing. A brace, G, hinged or otherwise applied to the head-stock and extending from it, serves to support it against the back pressure of the screw B.

The screw $a$, the nut C, the rotary head $g$, the two chains D D, and the hooks E E, arranged in and applied together and to the head-stock A, provided with the screw B, as described, constitute my invention for the purpose of connecting the head-stock with a timber against which it may be desirable to press or force a plank. The hooks are to be hooked into opposite sides of the timber—the rib of a vessel, for instance; after which the head-stock is to be revolved within its nut C and head $g$, so as to cause the said nut to recede on its screw, so as to draw the chains through the eyes of the hooks in a manner to cause the two hooks to take a firm grasp of the timber; after which the plank may be applied to the timber and, by means of the screw B, may be pressed closely up to it.

As heretofore made, apparatus or mechanism for the purpose described has been constructed so as to either screw into the timber or to have means of catching on a plank applied to that to which it may be desirable to press a plank. My invention avoids the necessity of making a screw-hole in the timber to receive a screw projecting from the stock, and it can be used to apply a plank to one side of a rib-timber when the other side thereof may have been completely planked.

What therefore I claim as my invention is—

The combination of the screw $a$, the nut C, the rotary head $g$, the two chains D D, and the hooks E E, the whole being constructed, arranged, and applied to the stock A, provided with the screw B, substantially as and so as to operate as and for the purpose hereinbefore specified.

JOSEPH C. THOMAS.

Witnesses:
JAS. M. STONE,
JOS. TITCOMB.